United States Patent
Vukelja

(10) Patent No.: US 10,537,754 B1
(45) Date of Patent: Jan. 21, 2020

(54) PERSONAL AIR PURIFICATION DEVICE AND RELATED METHODS

(71) Applicant: Nicholas Vukelja, Los Angeles, CA (US)

(72) Inventor: Nicholas Vukelja, Los Angeles, CA (US)

( * ) Notice: Subject to any disclaimer, the term of this patent is extended or adjusted under 35 U.S.C. 154(b) by 510 days.

(21) Appl. No.: 15/131,807

(22) Filed: Apr. 18, 2016

(51) Int. Cl.
| | | |
|---|---|---|
| *A62B 18/00* | (2006.01) | |
| *A62B 9/04* | (2006.01) | |
| *A62B 7/10* | (2006.01) | |
| *B01D 46/00* | (2006.01) | |
| *B01D 46/42* | (2006.01) | |

(52) U.S. Cl.
CPC ............. *A62B 18/003* (2013.01); *A62B 7/10* (2013.01); *A62B 9/04* (2013.01); *B01D 46/002* (2013.01); *B01D 46/4245* (2013.01)

(58) Field of Classification Search
CPC ........... A62B 18/003; A62B 7/10; A62B 9/04; A62B 23/00; A62B 23/02; A62B 23/025; A62B 18/00; A62B 18/006; A62B 18/02; A62B 18/025; A62B 18/04; A62B 18/045; A62B 18/06; A62B 18/08; A62B 18/082; A62B 18/084; B01D 46/002; B01D 46/4245; A61L 9/122
See application file for complete search history.

(56) References Cited

U.S. PATENT DOCUMENTS

| | | | | |
|---|---|---|---|---|
| 2,171,337 A | * | 8/1939 | Hellmann | A62B 17/005 128/201.29 |
| 5,048,516 A | * | 9/1991 | Soderberg | A62B 18/003 128/200.27 |
| 5,054,480 A | * | 10/1991 | Bare | A41D 13/11 128/201.25 |
| 5,267,557 A | * | 12/1993 | Her-Mou | A62B 18/006 128/206.21 |
| 5,353,605 A | * | 10/1994 | Naaman | A41D 13/0053 2/171.3 |
| 5,513,632 A | * | 5/1996 | Nepon | A61M 16/009 128/200.28 |

(Continued)

FOREIGN PATENT DOCUMENTS

| | | | | |
|---|---|---|---|---|
| WO | WO 2014090188 | * | 6/2014 | ............... A62B 7/10 |
| WO | WO 2015140776 A1 | * | 9/2015 | ............... A62B 7/10 |

OTHER PUBLICATIONS

English machine translation for Wo 2014090188, Espacenet.com, translated on Aug. 14, 2018.*

*Primary Examiner* — Tu A Vo
(74) *Attorney, Agent, or Firm* — Allen Dyer Doppelt & Gilchrist

(57) ABSTRACT

A personal air purification device includes at least one conduit assembly connected to a mounting assembly and a power supply arrangement. The at least one conduit assembly includes a conduit extending between an air inlet end and air outlet end, a filter and a fan. The filter is connected to the conduit and configured to remove contaminants from the air passing the through the conduit. The fan is connected to the conduit and configured to drive air flow through the filter and the conduit. The mounting assembly is configured to hold the conduit about the head of a wearer with the air inlet end positioned to generate a high pressure area proximate to a nose and mouth thereof. The power supply arrangement is configured to supply electrical power to the fan.

14 Claims, 5 Drawing Sheets

(56) References Cited

U.S. PATENT DOCUMENTS

| | | | | |
|---|---|---|---|---|
| 5,533,500 | A * | 7/1996 | Her-Mou | A42B 3/288 128/201.24 |
| 5,561,862 | A * | 10/1996 | Flores, Sr. | A42B 3/286 2/171.3 |
| 5,655,374 | A * | 8/1997 | Santilli | A41D 13/1218 2/905 |
| 5,711,033 | A * | 1/1998 | Green | A42B 3/286 2/171.3 |
| 6,065,473 | A * | 5/2000 | McCombs | A61M 16/0666 128/200.24 |
| 7,481,220 | B2 * | 1/2009 | Meyer | A61M 16/06 128/200.27 |
| 8,517,017 | B2 * | 8/2013 | Bowditch | A61M 16/00 128/204.23 |
| 9,205,218 | B1 * | 12/2015 | Bachan | A61M 16/105 |
| 9,480,290 | B2 * | 11/2016 | Czajka | A41D 13/1209 |
| 2003/0188743 | A1 * | 10/2003 | Manne | A62B 18/003 128/201.22 |
| 2004/0003810 | A1 * | 1/2004 | Templeton | A62B 17/04 128/201.22 |
| 2004/0055601 | A1 * | 3/2004 | De Luca | A62B 18/003 128/205.22 |
| 2005/0061316 | A1 * | 3/2005 | Manne | A62B 18/003 128/200.27 |
| 2005/0229557 | A1 * | 10/2005 | Little | A47C 7/383 55/385.1 |
| 2008/0087282 | A1 * | 4/2008 | Torgerson | A62B 18/003 128/201.22 |
| 2008/0307970 | A1 * | 12/2008 | Augustine | A61M 16/0875 95/273 |
| 2011/0126828 | A1 * | 6/2011 | Wu | A62B 7/10 128/201.25 |
| 2012/0174922 | A1 * | 7/2012 | Virr | A61M 16/0066 128/203.12 |
| 2013/0091624 | A1 * | 4/2013 | Czajka | A41D 13/1209 2/456 |
| 2014/0360496 | A1 * | 12/2014 | Reese | A61L 9/20 128/200.28 |
| 2014/0373846 | A1 * | 12/2014 | Kao et al. | A62B 7/10 128/204.23 |
| 2015/0174435 | A1 * | 6/2015 | Jones | A62B 7/10 128/202.13 |

\* cited by examiner

PERSONAL AIR PURIFICATION DEVICE AND RELATED METHODS

FIELD OF THE INVENTION

The present invention relates to personal air purification, and more particularly, to portable air purification devices worn by individuals.

BACKGROUND OF THE INVENTION

When faced with sub-optimal air quality, the typical solution for the individual has been some type of filter mask. While a wide variety of such masks are available, and can be very effective at removing unwanted contaminants from breathed air, wearing such masks has drawbacks. For example, many masks require greater breathing effort from the wearer to draw air through the filter material. There is also the possibility of discomfort, particularly if the mask is worn for an extended period of time. Accordingly, further improvements are possible.

SUMMARY OF THE INVENTION

In view of the foregoing, it is an object of the present invention to provide a personal air purification device and related methods. According to an embodiment of the present invention, a personal air purification device includes a first conduit assembly connected to a mounting assembly and a power connection. The first conduit assembly includes a first conduit extending between a first air inlet end and a first air outlet end, a first filter and a first fan. The first filter is connected to the first conduit and configured to remove contaminants from the air passing through the first conduit. The first fan is connected to the first conduit and configured to drive air flow through the first filter and the first conduit. The mounting assembly is configured to hold the first conduit about the head of a wearer with the air inlet end positioned to generate a high pressure area proximate to a nose and mouth thereof. The power supply arrangement is configured to supply electrical power to the first fan.

According to an aspect of the present invention, the purification device further includes a second conduit assembly having a second conduit extending between a second air inlet end and a second air outlet end, a second filter and a second fan. The second filter is connected to the second conduit and configured to remove contaminants from the air passing through the second conduit. The second fan is connected to the second conduit and configured to drive air flow through the second filter and the second conduit. The mounting assembly is configured to hold the first conduit and the second conduit about the head of the wearer with the first and second air inlet ends positioned proximate to a nose and mouth thereof. The power supply arrangement is configured to supply electrical power to the first fan and the second fan.

These and other objects, aspects and advantages of the present invention will be better appreciated in view of the drawings and following detailed description of preferred embodiments.

DETAILED DESCRIPTION OF PREFERRED EMBODIMENTS

Figure 1:
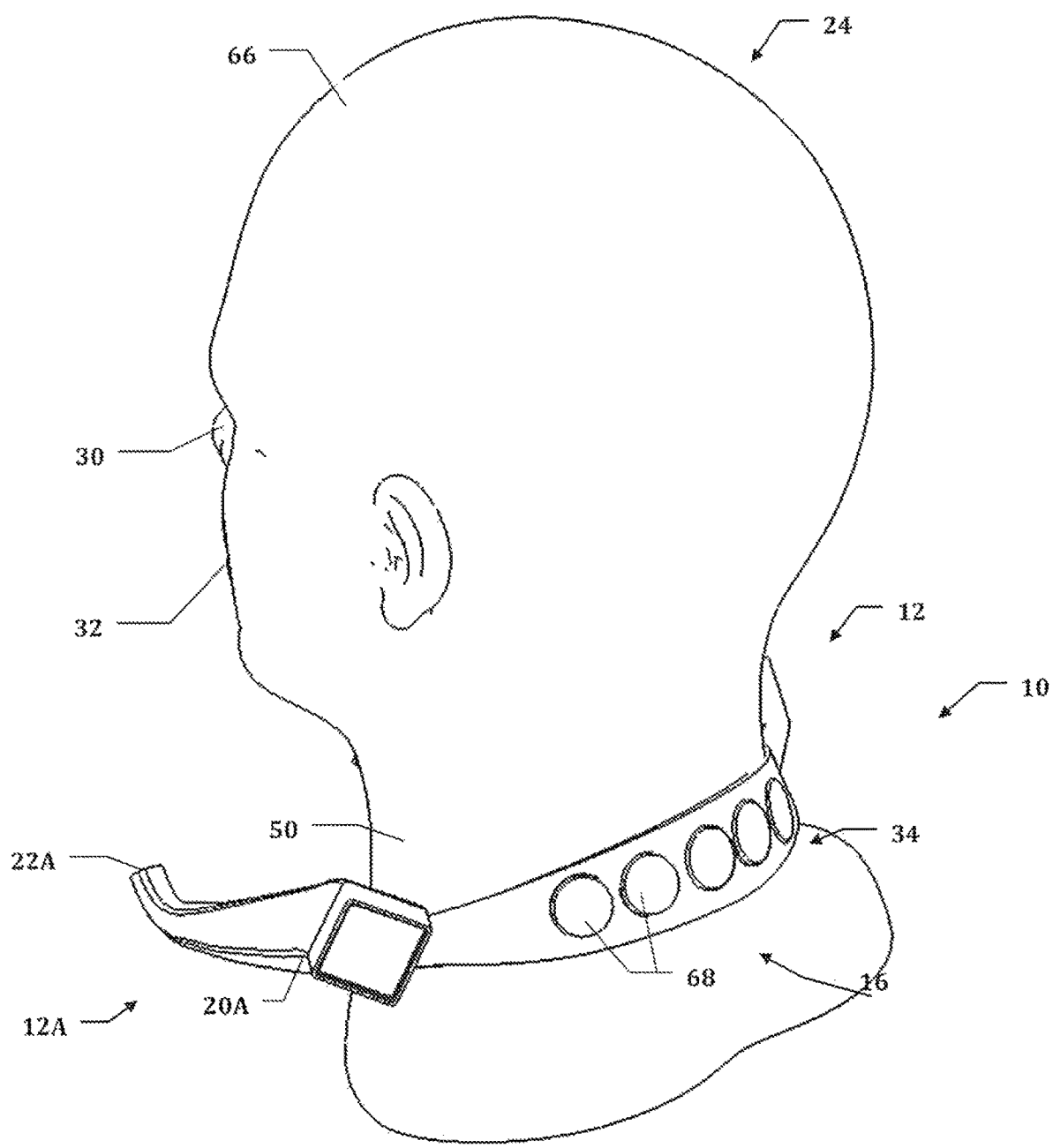
FIG. 1 is a perspective view of a user wearing a personal air purification device, according to an embodiment of the present invention.
Figure 2:
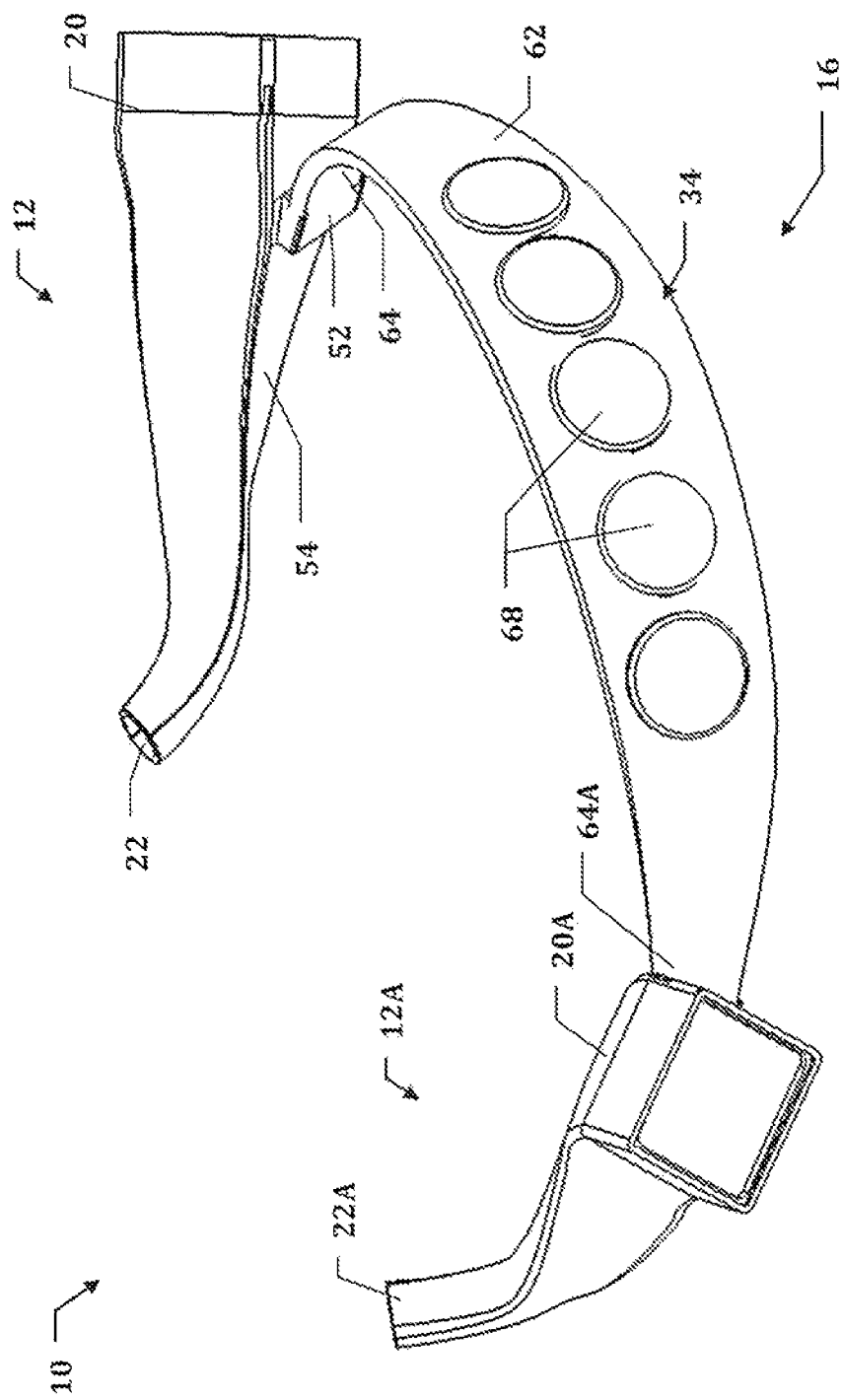
FIG. 2 is a perspective view of the personal air purification device of FIG. 1.
Figure 3:
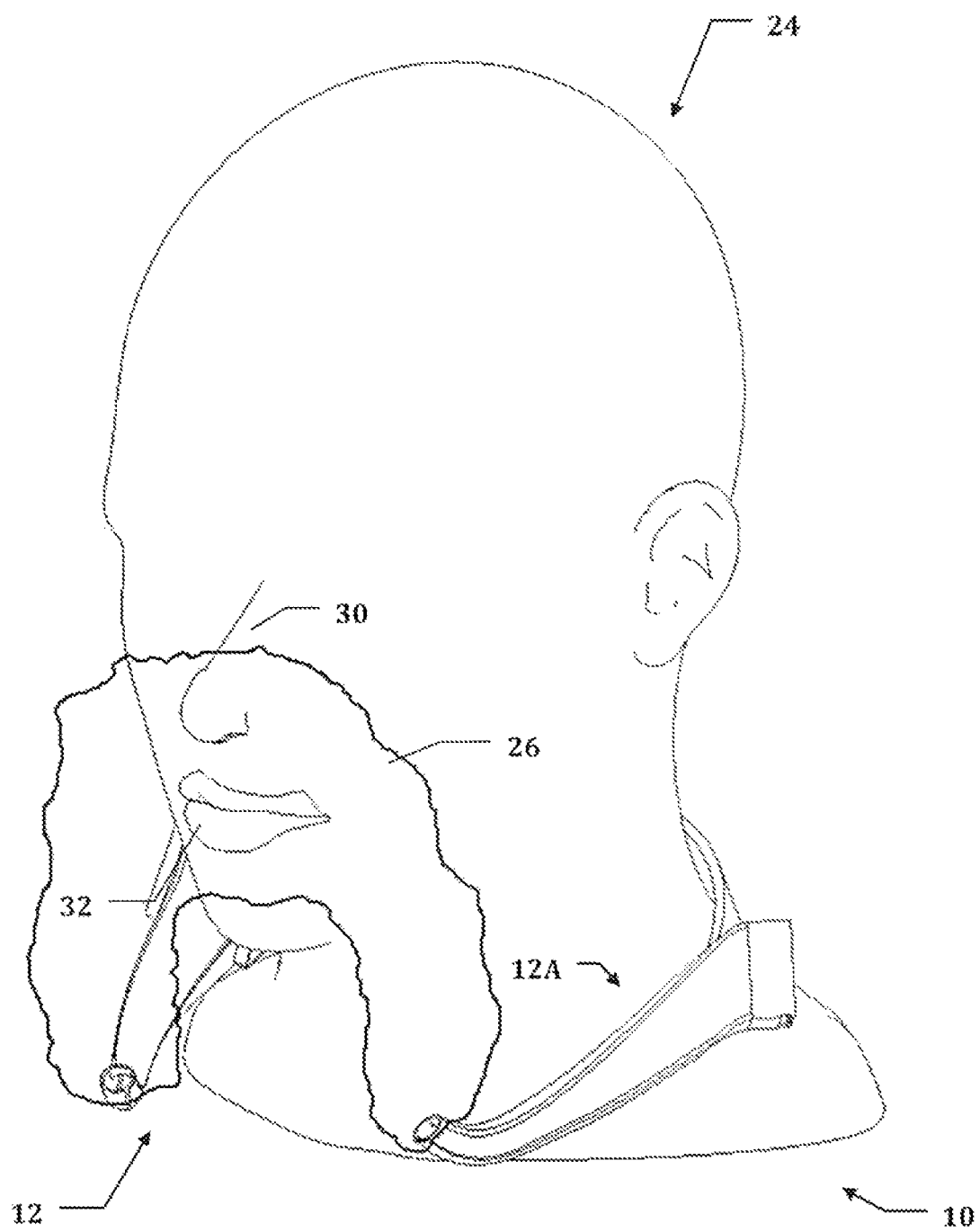
FIG. 3 is a perspective view of the personal air purification device of FIG. 1, showing a high pressure area generated thereby.

Referring to FIGS. 1-3, according to an embodiment of the present invention, a personal air purification device 10 includes first and second conduit assemblies 12, 12A attached to a mounting assembly 16. Each of the conduit assemblies 12, 12A is configured to draw air in through an air inlet end 20, 20A, filter the air and exhaust the filtered air through an air outlet end 22, 22A. The mounting assembly 16 is configured to support the device 10 on a wearer 24 with the air outlet ends 22, 22A of the conduit assemblies 12, 12A exhausting the filtered air to generate a high pressure area 26 proximate to a nose 30 and mouth 32 of the wearer 24. A power supply arrangement 34 supplies electrical power to the conduit assemblies 12, 12A for the operation thereof.

Figure 4:
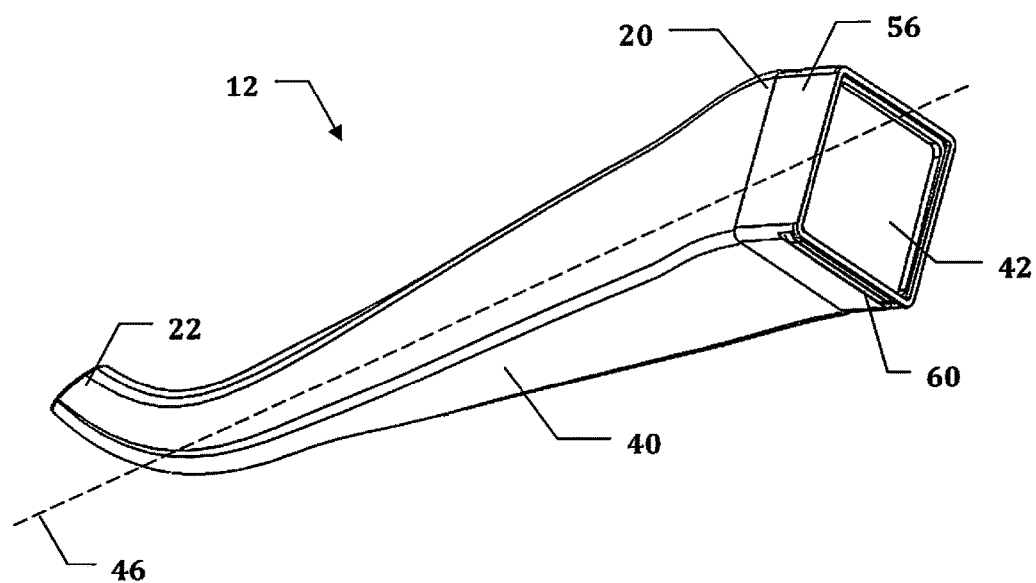
FIG. 4 is a perspective view of a conduit assembly of the personal air purification device of FIG. 1.
Figure 5:
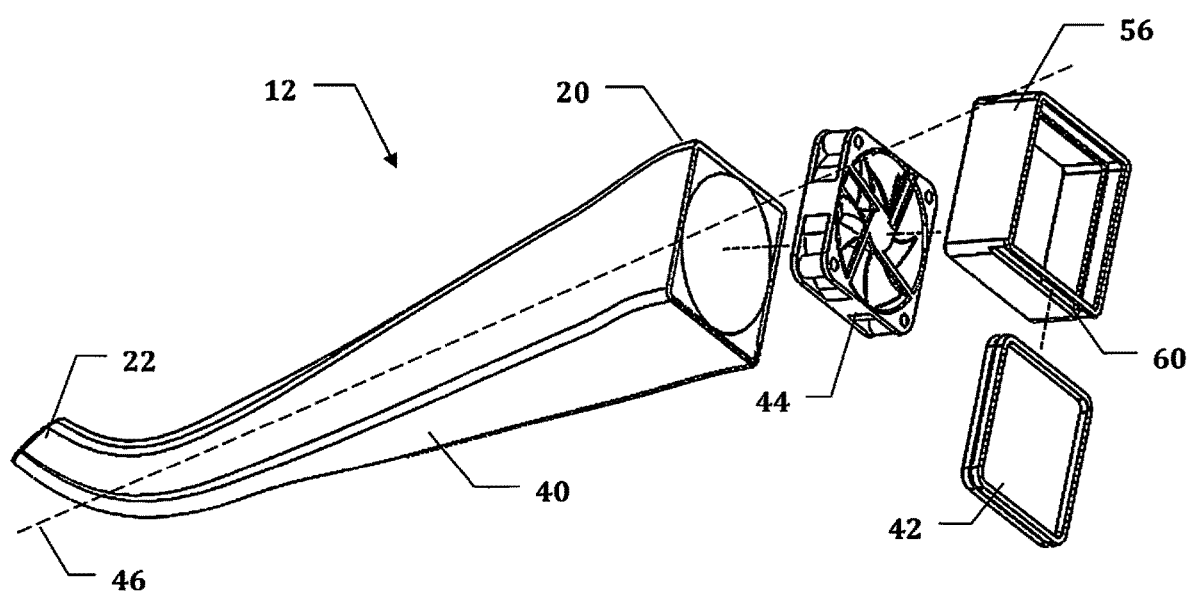
FIG. 5 is a exploded perspective view of the conduit assembly of FIG. 4.

Referring to FIGS. 4 and 5, the conduit assembly 12 (the conduit assembly 12A being essentially a mirror image thereof) includes a conduit 40 extending between the air inlet and outlet ends 20, 22. A filter 42 is arranged at the air inlet end 20 for filtering the air passing through conduit assembly 12, with a fan 44 generating the necessary airflow. The fan 44 is electrically connected to the power supply arrangement 34 to receive electrical power therefrom.

The conduit 40 decreases in cross-sectional area from the air inlet end 20 to the air outlet end 22, thereby increasing the pressure of air drawn therethrough. Additionally, a cross-sectional shape of the conduit 40 transitions from generally rectangular or square at the air inlet end 20 to generally circular at the air outlet end 22, which facilitates mounting of the fan 44 and filter 42, although other geometries could be used; for example, the cross-sectional shape of the conduit 40 could be generally circular at both ends.

The conduit 40 extends generally along a conduit axis 46. At the air outlet end 22, the conduit 40 is angled upwardly (with relative directional terms being referenced to a standing orientation of the wearer 24—as in FIGS. 1 and 3) from the conduit axis 46 to better direct the filtered, pressurized air toward the nose 30 and mouth 32. At the air inlet end 20, the conduit 40 is angled outwardly, such that air is not drawn in directly across a neck 50 of the user. An attachment bracket 52 (see FIG. 2) is formed on an inner side 54 of the conduit 40 for connection to the mounting assembly 16.

The filter 42 and the fan 44 are preferably mounted in a common housing 56 attached to the outlet end of the conduit 40. The filter 42 is advantageously positioned, in the direction of airflow, before the fan 44, such that the fan 44 pulls air through the filter 42. To facilitate filter 42 replacement without removal of the housing 56, a filter replacement slot 60 is defined along an edge of the housing 56.

Referring again to FIG. 2, the mounting assembly 16 includes a band 62 having opposite ends 64, 64A connecting to the attachment brackets 52, 52A (only bracket 52 being visible in FIG. 2, bracket 52A being a mirror image thereof)

of the conduit assemblies 12, 12A. Advantageously, electrical connections for the conduit assemblies 12, 12A are also made via the junction of ends 64, 64A and brackets 52, 52A. A width of the band 62 can be fixed, or adjustable to accommodate for a wider range of neck 50 sizes. Preferably, the band 62 is flexible enough to allow the opposite ends 64, 64A to be flexed apart when donning the device 10, while rigid enough to support the conduit assemblies 12, 12A once in place.

The depicted mounting assembly 16 is configured to hold the conduit assemblies 12, 12A about the neck 50, although the present invention is not necessarily limited thereto. Provided the conduit assemblies 12, 12A are generally held about the head 66, other means for mounting could be employed. For example, a mounting assembly could be integrated into the collar region of a garment to conduit assemblies in the desired locations. Likewise, a mounting assembly could be integrated into headgear, such as a hat, headband, glasses, etc., for suspending conduit assemblies in the desired locations.

In the depicted embodiment, the power supply arrangement 32 includes a plurality of batteries 68 arranged in the band 62 of the mounting assembly 16. The batteries 68 could be replaceable, single-use cells or rechargeable cells. When rechargeable cells are used, recharging could be accomplished in situ via an external power connection and/or via an onboard or connected power source, such as photovoltaic cells, a kinetic energy generator or the like.

Figure 6:
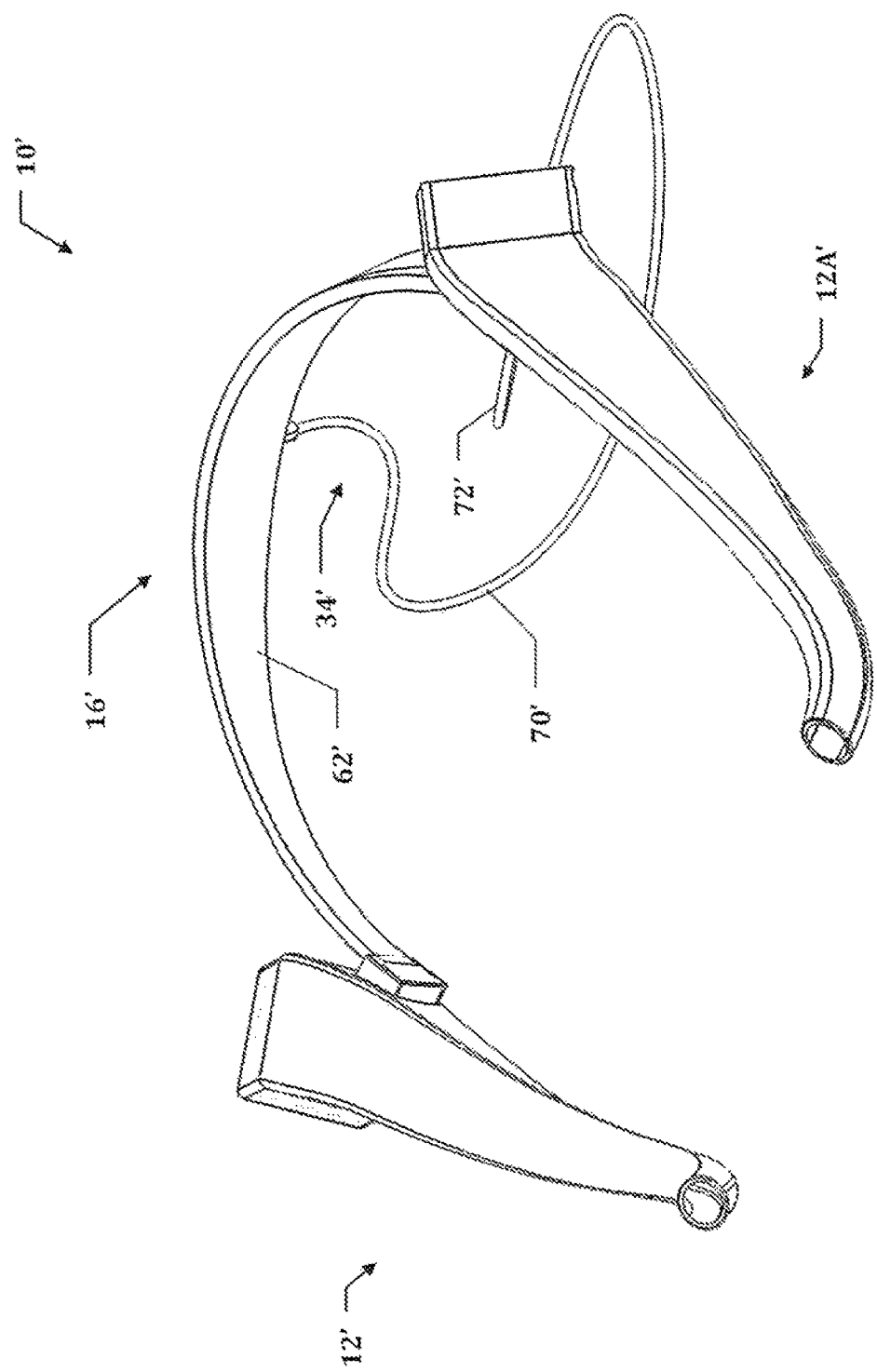
FIG. 6 is a perspective view of a personal air purification device, according to another embodiment of the present invention.

Referring to FIG. 6, in an alternate embodiment of a personal air purification device 10', the power supply arrangement 32' includes an external power connection 70' for receiving operating power from an external power supply, such as an external battery pack. In the description of alternate embodiments, like components are described by like reference numbers with the addition of a prime (') notation. Except as otherwise described, the function and structure of like components is substantially the same as described above.

The external power connection 70' is advantageously supplied with a standard power connector 72', such as a micro universal serial bus (USB) connector, allowing the purification device 10' to be powered from a personal electronic device, such as a smart phone. A device-specific application could be provided for the personal electronic device, allowing a wearer to turn power on and off, adjust fan speed, monitor run-time, etc.

In operation, referring to FIGS. 1-5, the personal air purification device 10 is donned by the wearer 24, and power is supplied to the fans 44 of the conduit assemblies 12, 12A to initiate airflow through the conduits 40. Ambient air is drawn through the filters 42, and purified airflow is forced out the air outlet ends 22, 22A to form the high pressure area 26 proximate to the nose 30 and mouth 32 of the wearer 24. The wearer 24 consequently breathes primarily purified air from the area 26, and unpurified ambient air and airborne particles are deflected aware from the nose and mouth 32 by the high pressure area 26.

It will be appreciated that the dimensions and operational parameters of the personal air purification device 10 can be varied depending on factors specific to the wearer and desired use. For example, a device intended for use only while walking would generally not need to generate as much airflow as a device for use while running. Likewise, a device for use by children would generally not need to generate as much airflow as a device for use by adults. The degree and type of filtration could also be varied depending on the anticipated concentration and type of pollutants in a given geographical area.

Non-limiting examples of possible materials for the filters include fiberglass, polyester, foam, activated carbon, activated aluminum, potassium permanganate, antimicrobial materials, charcoal or other materials adapted for separating dust particles, bacteria and viruses, airborne particles, cigarette smoke, and other pollutants. The structural components of the personal purification devices can be made out of any suitable materials, with plastics and other polymeric materials being generally preferred.

The foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A personal air purification device comprising:
a first conduit assembly including:
a first conduit extending between an air inlet end and a single air outlet end;
a first filter connected to the first conduit and configured to remove contaminants from air passing through the first conduit; and
a first fan connected to the first conduit and configured to drive air flow through the first filter and the first conduit;
a second conduit assembly;
a mounting assembly configured to hold the first conduit about a head of a wearer with the single air outlet end positioned to generate a high pressure area proximate to a nose and mouth thereof; and
a power supply arrangement configured to supply electrical power to the first fan;
wherein a cross-sectional outside area of the first conduit at the air inlet end is larger than a cross-sectional outside area of the first conduit at the single air outlet end, and a cross-sectional inside area of the first conduit decreases from the air inlet end to the single air outlet end;
wherein the mounting assembly includes a flexible band, the first conduit assembly and the second conduit assembly are mounted on opposite ends of the flexible band and the flexible band is configured to allow the opposite ends to be flex apart when donning the personal air purification device onto the wearer, wherein the flexible band comprises a thickness that is less than a thickness of each of the first conduit assembly and second conduit assembly, the flexible band is configured to be worn on a back of a neck of the wearer and configured to place the first conduit assembly and second conduit assembly on a left and a right shoulders of the wearer.

2. The personal air purification device of claim 1, wherein the second conduit assembly including:
a second conduit extending between an air inlet end and air outlet end;
a second filter connected to the second conduit and configured to remove contaminants from air passing through the second conduit; and
a second fan connected to the second conduit and configured to drive air flow through the second filter and the second conduit;

wherein the mounting assembly is further configured to hold the second conduit about the head of a wearer with the air outlet end positioned proximate to the nose and mouth thereof, and the power supply arrangement is further configured to supply electrical power to the second fan.

3. The personal air purification device of claim 2, wherein the first filter and the second filter are removable.

4. The personal air purification device of claim 2, wherein the power supply arrangement includes at least one battery housed within the mounting assembly and configured to supply electrical power to the first fan and the second fan.

5. The personal air purification device of claim 2, wherein the power supply arrangement includes a power supply in an external housing, and a cord extending between the mounting assembly and the external housing.

6. The personal air purification device of claim 2, wherein speeds of the first fan and the second fan are adjustable independently.

7. The personal air purification device of claim 1, wherein the first conduit is angled upwardly, relative to a standing orientation of the wearer, at the single air outlet end.

8. The personal air purification device of claim 1, wherein the first conduit is angled outwardly, relative to a standing orientation of the wearer, at the air inlet end.

9. The personal air purification device of claim 1, wherein the first fan is mounted downstream of the air inlet end of the first conduit and the first filter, such that air flow is drawn through the first filter before passing through the first fan.

10. The personal air purification device of claim 1, wherein the first fan and the first filter are both mounted in a first housing connected to the air inlet end of the first conduit.

11. The personal air purification device of claim 10, wherein the first filter is removable from the first housing independently of the first fan.

12. The personal air purification device of claim 1, wherein the power supply arrangement includes at least one battery held by the mounting assembly.

13. The personal air purification device of claim 1, wherein the power supply arrangement includes an external power connection.

14. The personal air purification device of claim 13, wherein the external power connection includes a power connector configured to receive power from a personal electronic device.

* * * * *